Jan. 14, 1969     R. L. SWANKE     3,422,330
MULTI-SPEED CONTROL SYSTEM FOR ELECTRIC MOTORS
Filed Nov. 16, 1965
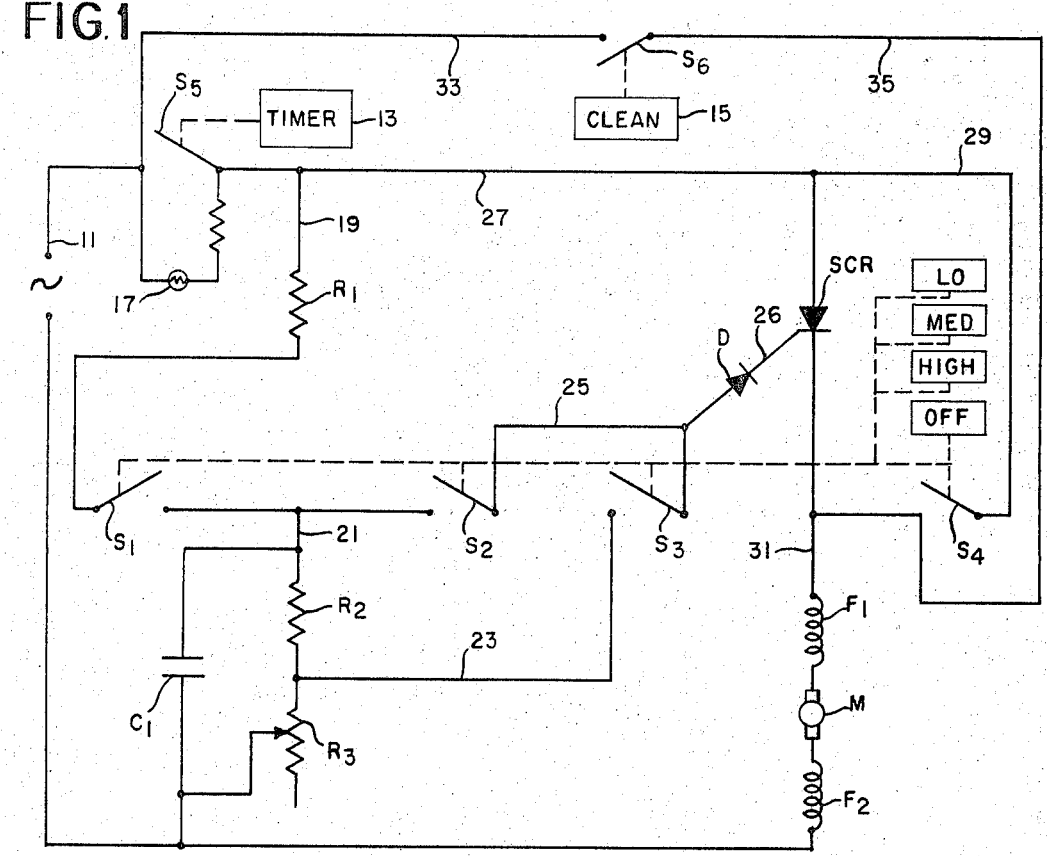
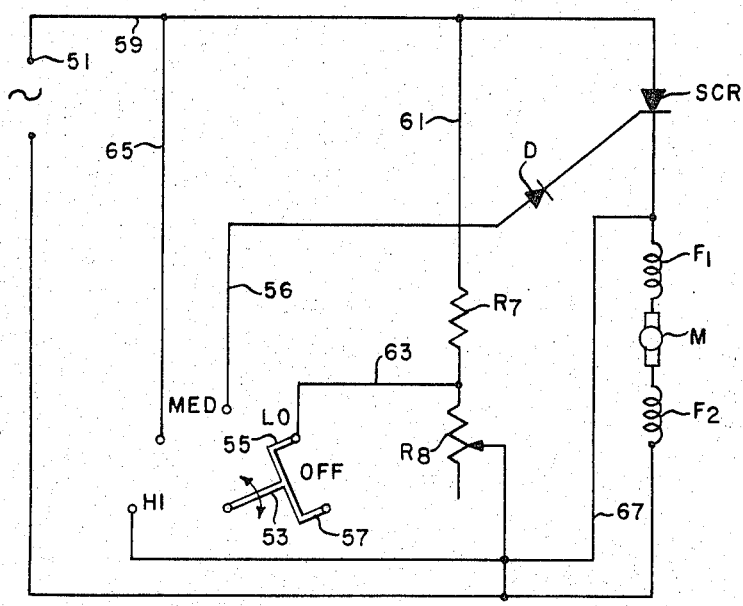
*INVENTOR*
ROY L. SWANKE

United States Patent Office 3,422,330
Patented Jan. 14, 1969

3,422,330
MULTI-SPEED CONTROL SYSTEM FOR ELECTRIC MOTORS
Roy L. Swanke, Newington, Conn., assignor to Dynamics Corporation of America, New York, N.Y., a corporation of New York
Filed Nov. 16, 1965, Ser. No. 508,118
U.S. Cl. 318—305         6 Claims
Int. Cl. H02p 5/00; H02p 5/12; H02k 27/20

ABSTRACT OF THE DISCLOSURE

A speed control system for electric motors including a manual switching means, a silicon controlled rectifier and diode circuit connected between the switching means and the motor so as to determine the lower speeds of the motor by half-wave control, and a circuit for by-passing the rectifier and diode so as to provide a direct running of the motor at high speeds.

---

The present invention relates generally to speed control systems for electrical motors and more specifically to a multi-speed control system using solid state components.

Fractional horsepower electric motors are in wide use today in many household type appliances, including mixers, blenders, hand tools and the like. Additionally, developments in the past years have provided these appliances with multiple speed controls to increase the versatility of the device. The development of such equipment has necessarily added additional circuitry and components to the control systems of these motors in order that they may provide the necessary multi-speed operation. Such circuitry and components have necessarily added to the bulk and the cost of the equipment being used. In view of the present-day mass production techniques and the large number of units involved, any reduction in number of parts and size of the equipment will be highly desirable from both an economic standpoint and for the convenience of the ultimate user of the device.

Accordingly, it is an object of this invention to provide a simplified multi-speed motor control system using solid state components for obtaining the desired degree of control.

It is a further object of this invention to provide a multi-speed solid state motor control system in conjunction with a simplified manual switching means.

Another object of the invention is to provide a multi-speed solid state motor control system with a manual switching device with an automatic timing means used in conjunction therewith.

These and other objects of the invention will become apparent from the following description when taken in conjunction with the drawings wherein:

FIG. 1 is a schematic representation of one embodiment of the present invention using a push button type of switch control, and FIG. 2 is a simplified schematic illustration of another embodiment of the invention using a manually rotatable type of switch control.

Basically, the invention consists of a switching means for selecting the desired motor speed and associated silicon controlled rectifier and diode circuit means whereby the speed of the motor in the low and medium ranges is determined by a half-wave control in these speeds with the bypass of the solid state components for direct running of the motor at high speed.

Turning now to the specific embodiment as illustrated in FIG. 1, there are shown input terminals 11 for connection with a standard 120 volt house current supply. This input is connected to switch S5 which is normally open but may be activated by a timer 13. Such a timer may be as shown in copending application Ser. No. 376,804, filed June 22, 1964, entitled, "Electric Blenders," and assigned to the assignee of the present application. The output of switch S5 is in turn connected to the various leads according to the speed desired.

One path is through lead 19 and resistor R1 to switch S1 with the output of switch S1 also having dual selective paths to the motor. One output path of switch S1 is through the voltage divider comprising resistor R2 and the rheostat R3 to ground with capacitor C1 in parallel therewith. This voltage divider has an output on lead 23 to switch S3.

A further output from switch S1 leads to switch S2 with an output through lead 25. Both of the outputs from switch S2 and S3 are connected to the anode terminal of diode D with the anode of the diode being connected to the gate terminal 26 of silicon controlled rectifier SCR.

With the timer switch S5 closed, lead 27 connects the anode of the silicon controlled rectifier to the supply voltage from the input terminals 11. The cathode of the silicon controlled rectifier is connected to one of the field windings F1 of the motor M. The remaining field winding F2 is connected to terminals 11 so as to form a completed circuit.

With the timer switch S5 closed, lead 29 also connects the output from terminals 11 to switch S4 which has an output coupled to the lead 31 connected directly to the field winding F1 of the motor M. A further connection to the motor is provided through switch S6 by leads 33 and 35 for purposes which will become obvious as the description proceeds.

With the circuit as described above, the operation of the motor is basically provided by the silicon controlled rectiler SCR in both the lower and medium ranges, which rectifier is in turn triggered by an adjustable signal through the diode D to the gate 26 of the rectifier.

The push button switches as schematically represented and termed "LO," "MED," "HI," and "OFF" are ganged together in a known fashion so that operation of one terminates operation of any of the other buttons so as to control the operation of the switches as described below.

Assume that the motor is off and that the terminals 11 are connected to a normal alternating current voltage supply. If the push button "LO" is pressed, it will close switches S1 and S3. Any type of timer arrangement may be used, but it is preferable to use the system as described in the above-identified application wherein the timer is first set and actuation of any of the switcthes causes the timer to start its operation. Therefore, in the "LO" position, timer switch S5 is closed as are switches S1 and S3.

When this line voltage is supplied to the circuit, with the motor armature standing still, no counter EMF is induced in the motor. Therefore, the current to gate 26 of the silicon controlled rectifier will start to flow as soon as the voltage at the anode terminal of the diode D exceeds the forward voltage drop of the diode and the gate drop of the silicon controlled rectifier. This will fire the silicon controlled rectifier early in the line voltage sinusoidal cycle, providing ample energy to accelerate the motor.

As the motor approaches its preset speed, the counter EMF in the motor builds up. This voltage is positive at the terminal of the field winding F1 and bucks the flow of gate current in the silicon control rectifier from the capacitor C1 and through the voltage divider R2, R3 until such time as the voltage at the anode of diode D exceeds the motor voltage. At this point, the higher voltage requirement on capacitor C1 retards the firing angle and allows the motor to cease accelerating. Once the motor has reached its preset operating speed as determined by the setting of the rheostat R3 together with the resistance R2, the counter EMF provides automatic speed regulating action.

As an example, if a heavy load starts to pull down the motor speed, the counter EMF decreases and the silicon controlled rectifier fires earlier in the sinusoidal cycle. The additional energy thus furnished to the motor supplies the necessary work to handle the increased load. Conversely, a light load with its tendency to increase speed, raises the motor counter EMF, retarding the firing angle and reducing the voltage applied to the motor. Any variation can be obtained by varying the specific parameters of R1, R2, R3 and C1.

The above operation is also descriptive of the motor speed when the "MED" button is activated. This activates and closes switch S1 and switch S2. Under this operation the voltage divider circuit is bypassed and a higher energy is supplied to the motor directly through resistance R1.

When it is desired to run the motor at maximum speed, the "HI" button is activated which closes switch S4 and connects the motor directly to the output of the terminals 11. When the "OFF" button is pushed, switches S1, S2, S3 and S4 are open and the motor ceases operating.

In order to provide a manual means for cleaning the device, such as is desirable for a blender, an additional switch S6 is provided and controlled by a "clean" button 15 and switch S6 so as to connect the motor directly to the terminals 11.

The circuit as described above allows the use of a standard 120 volt single speed motor instead of having to wind a special motor. Additionally, this control improves the brush life in that the negative brush tends to wear at twice the normal rate when used in DC application, as would be the case on medium and low speeds. However, in most applications, such as the blender, high speed is used a majority of the time and, therefore, the present circuit eliminates the DC during that operation and obtains optimum overall brush wear on the motor.

A pilot light 17 may further be connected across the timer so that any time the circuit is completed to the motor the light will be on when the timer switch is open. Therefore, when the set time has been completed and switch S5 opens, the pilot light 17 will be lighted and indicate that the particular job, such as blending, is completed. It may be seen that with the switching means provided hereinabove there is always a supply of 120 volts AC to both sides of the indicating light when the timer is off and any one of the pushbuttons such as "LO," "MED," or "HI" is in activated position. Further, the light is automatically disconnected when the off pushbutton is activated.

Turning now to FIG. 2, there is shown a simplified schematic drawing of the present invention using a rotating switch having dual contact arms. It is to be understood that the various components shown in FIG. 1 could also be incorporated with the circuit shown in FIG. 2 but have been eliminated therefrom for purposes of simplicity and clarity.

Again, the terminals 51 may be connected to a standard 120 volt AC house supply. The operation of the silicon controlled rectifier and diode circuit is substantially the same as described above in connection with FIG. 1.

The rotatable switch 53 is similar to that shown in U.S. Patent No. 2,707,741 entitled "Electric Switch Assembly," except that it employs dual contact arms 55 and 57.

In operation, when switch 53 is rotated counterclockwise so that dual contact arms span the "LO" contacts, voltage is supplied to the cathode of diode D through leads 59 and 61, voltage divider R7, R8, lead 63, switch 53 and lead 56. The operation of the motor with the silicon controlled rectifier is similar to that of the "LO" position in FIG. 1.

When the switch 53 is rotated so that the contact arms span the "MED" contacts, voltage is supplied to diode D through leads 59 and 65, switch 53 and lead 56, thus bypassing the voltage divider.

Rotation of the switch to the "HI" position connects the field winding F1 of the motor M directly to terminal 51 through leads 59 and 65, switch 53 and lead 67.

Integration of the switch and control circuit provides a compact unit particularly if a printed circuit board is used and the switch is mounted directly on the board. Such an arrangement is particularly suitable for power tool equipment requiring the type of AC-DC rating provided by such a switch.

By modifying the basic switch so as to include the additional contact arm, the number of components in the solid state circuit may be appreciably reduced. Additionally, a motor wound for 120 volts may be used instead of one wound for 75 volts, which would be necessary to obtain the same performance operating on half-wave as is obtained with full-wave operation on 120 volts.

It is to be understood the above description and accompanying drawings are illustrative only and that various modifications thereof would fall within the scope of the invention as set forth in the following claims.

What is claimed is:
1. A multi-speed control system for an electrical motor comprising,
  input terminal means for connection with a source of alternating current,
  a silicon controlled rectifier having its anode connected to one of said input terminal means and its cathode connected to one of the field coils of said motor, the other field coil of said motor being connected to the other of said terminals,
  a normally open switch between said rectifier and said one of said terminals,
  timer means for actuating said switch,
  a pilot light connected across said switch,
  manual switching means adjustable to first, second, third and fourth positions,
  a variable voltage divider means coupled to the output of said timer controlled switch,
  a diode having its cathode connected to the gate terminal of said rectifier,
  circuit means for connecting the output of said voltage divider means to the anode of said diode when said manual switching means is in said first position,
  circuit means for connecting the output of said timer controlled switch to the anode of said diode when said switching means is in said second position,
  circuit means for connecting the output of said timer controlled switch to said one of said field coils when said switching means is in said third position, and
  circuit means for disconnecting said motor from said input terminal means when said switching means is in said fourth position.
2. A multi-speed control system comprising,
  terminal means for connection with an AC voltage source,
  an electric motor having the field coils thereof connected across said terminals,
  a silicon controlled rectifier connected between one of said terminal means and one of said field coils, the other of said field coils being connected to the other of said terminals,
  a diode having the cathode thereof connected to the gate terminal of said rectifiier,
  manually controlled switch means adjustable to first, second, third and fourth positions, a voltage divider connected across said terminals, circuit means connecting the output of said voltage divider to the anode of said diode when said switch is in said first position, circuit means connecting said one of said terminals to the anode of said diode when said switch is in said second position, circuit means connecting said one of said field coils to said one of said terminals when said switch is in said third position, and circuit means for disconnecting said motor from said voltage source when said switch is in said fourth position.

3. The system of claim 2 wherein said switching means comprises a rotary switch having dual contact arms for mating with contact terminals connected to said circuit means.

4. The system of claim 2 wherein said switching means comprises a plurality of push buttons for closing contact terminals connected to said circuit means.

5. The system of claim 4 further comprising a time controlled switch connected between said terminal means and said manually controlled switch means.

6. The system of claim 5 further comprising a pilot light connected across said time controlled switch.

References Cited

UNITED STATES PATENTS

| | | | |
|---|---|---|---|
| 3,058,044 | 10/1962 | Herr | 318—246 |
| 3,141,429 | 7/1964 | Momberg et al. | 318—246 X |
| 3,209,228 | 9/1965 | Gawron | 318—345 |
| 3,218,511 | 11/1965 | Rosenbaum | 323—22 X |
| 3,225,232 | 12/1965 | Turley et al. | 318—345 X |
| 3,278,821 | 10/1966 | Gutzwiller | 318—345 X |

ORIS L. RADER, *Primary Examiner.*

B. A. COOPER, *Assistant Examiner.*

U.S. Cl. X.R.

318—345